United States Patent [19]
Watanabe

[11] Patent Number: 6,064,465
[45] Date of Patent: May 16, 2000

[54] REPRODUCTION EQUIPMENT FOR PRINTING NEWSPAPERS

[75] Inventor: Takemi Watanabe, Toyonaka, Japan

[73] Assignee: Kabushiki Kaisha Kaneda Kikai Seisakusho, Osaka-fu, Japan

[21] Appl. No.: 09/087,986

[22] Filed: Jun. 1, 1998

[51] Int. Cl.[7] ............................. G03B 27/58; G03B 27/48
[52] U.S. Cl. .............................................. 355/47; 355/48
[58] Field of Search ................................. 355/47, 48, 85, 355/104; 347/104, 105; 101/463.1, 465, 466; 358/497, 474

[56] References Cited

U.S. PATENT DOCUMENTS

| | | | |
|---|---|---|---|
| 4,745,487 | 5/1988 | Nishikawa | 358/289 |
| 5,345,870 | 9/1994 | Bailey et al. | 101/463.1 |
| 5,626,076 | 5/1997 | Ireton | 101/401.1 |
| 5,887,525 | 3/1999 | Okamura et al. | 101/463.1 |
| 5,894,319 | 4/1999 | Okamura et al. | 347/264 |

*Primary Examiner*—Safet Metjahic
*Assistant Examiner*—Hung Henry Nguyen
*Attorney, Agent, or Firm*—Griffin & Szipl, P.C.

[57] ABSTRACT

An apparatus for producing printing plates (1) for printing newspapers includes: a plate feeder (2) for feeding plate materials (A); an exposure device (6) for exposing the plate materials conveyed from the plate feeder, the exposure device having an exposure drum (21) which is inclined by a specified angle $\theta$ with respect to a direction perpendicular to a direction of advancement of the plate materials and on which the plate materials are wound spirally, and an exposing element (22) for exposing the plate materials wound on the exposure drum; a development device (8) for developing the plate materials conveyed from the exposure device; and a guide device (12) capable of guiding two plate materials (A1) having standard width or one plate material (A2) having double width when they are conveyed from the plate feeder via the exposure device to the development device.

4 Claims, 10 Drawing Sheets

REPRODUCTION EQUIPMENT FOR PRINTING NEWSPAPERS

BACKGROUND OF THE INVENTION

This invention relates to an improvement in an apparatus for producing printing plates for printing newspapers of the so-called CTP (Computer To Plate) type in which an image drawing signal from a computer is used to produce a required image drawing directly on a plate material with a laser.

Such an apparatus for producing printing plates for printing newspapers, for example, has heretofore been described in Japanese Laid-Open Patent No. 9-66595.

Basically, this apparatus comprises a plate feeder (a plate feeder section) for feeding a plate material; an exposure device (electrification and image drawing section) for exposing the plate material conveyed from the above-mentioned plate feeder with the plate material being held in a horizontal position; and a development device (a development-fixing section, an elution section, a post-treatment section) for developing the plate material conveyed from the exposure device.

PROBLEMS TO BE SOLVED BY THE INVENTION

Although it is described in No. 9-66595 that the apparatus of that publication can handle both a plate material having standard width (a first plate material for one page of newspaper, or a plate material for two pages of newspaper obtained by connecting two of the first plate materials longitudinally) and a plate material having double width (a second material for two pages of newspaper connected laterally, or a third plate material for four pages of newspaper obtained by connecting two second plate materials longitudinally), a specific construction of such apparatus has not been detailed so that it is not clear whether these plate materials can be produced correctly and efficiently.

In the apparatus disclosed in the above-mentioned Japanese Laid-Open Patent No. HEI9-66595, with a laser scanning head being placed opposite a plate material arranged horizontally, the laser scanning head is caused to move rightward or leftward at a high speed to draw an image on the plate material.

However, in order to repeat an operation in which the laser scanning head, moving at a high speed, is caused to stop at an end of the plate material, and from there move in the reverse direction, a position control, or a speed control, of the laser scanning head becomes complex. As a result, there have been the problems that it has taken a long time to produce a printing plate for printing, or that, due to difficulties in providing accurate mechanical position control, it has been extremely difficult to produce a high precision printing plate permitting clear printing.

Figure 6:
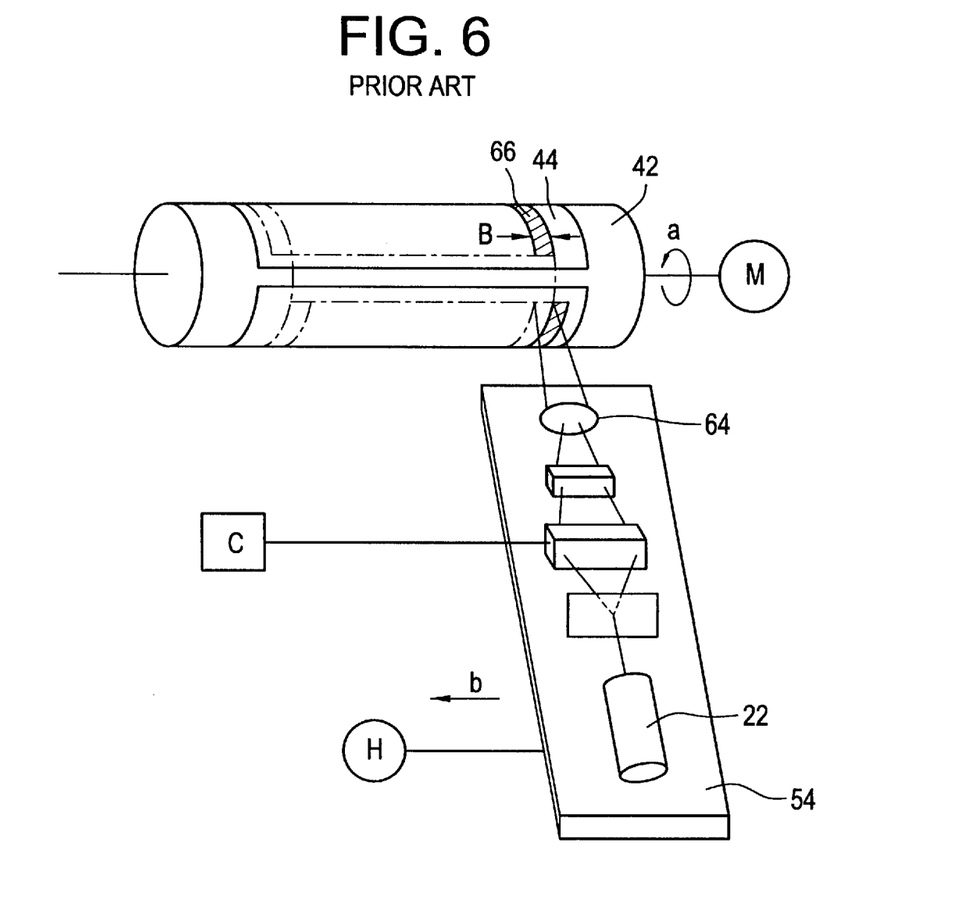
FIG. 6 is a simplified, segmented, isometric view showing one example of a prior-art drum-type laser exposure device for exposing a plate material.

On the other hand, a laser exposure device has been developed for exposing a plate material wound on a drum, as shown in FIG. 6, for solving the above-mentioned problems related to drawing an image on a horizontal printing plate with a laser scanning head. That is, in this exposure device, a plate material 44 is wound around a drum 42 in a manner shown in FIG. 6, which drum is rotationally driven by a motor M in a direction of an arrow a. Then, by use of a multibeam 64 of a laser beam controlled by an image signal of a computer C, an image band 66 with a band width B is formed on the plate material 44. Further, for one revolution of the drum 42, an optical base 54, loaded with a generator of the multibeam 64 and the like, is moved by a moving mechanism H, continuously at a constant speed, a distance of the band width B in a direction of an arrow b.

Structurally, the above-mentioned drum-type laser exposure device of FIG. 6 has an optical base 54 provided with the laser multibeam 64 which is caused to move continuously in the lateral direction, so that, compared with the structure of a conventional exposure device in which a laser scanning head is reciprocally moved rightward and leftward above a horizontal plate material, the exposure speed can be significantly increased and a laser scanning head position becomes easy to control, thereby making it possible to produce a high precision printing plate which permits a clear printing.

Figure 7A:
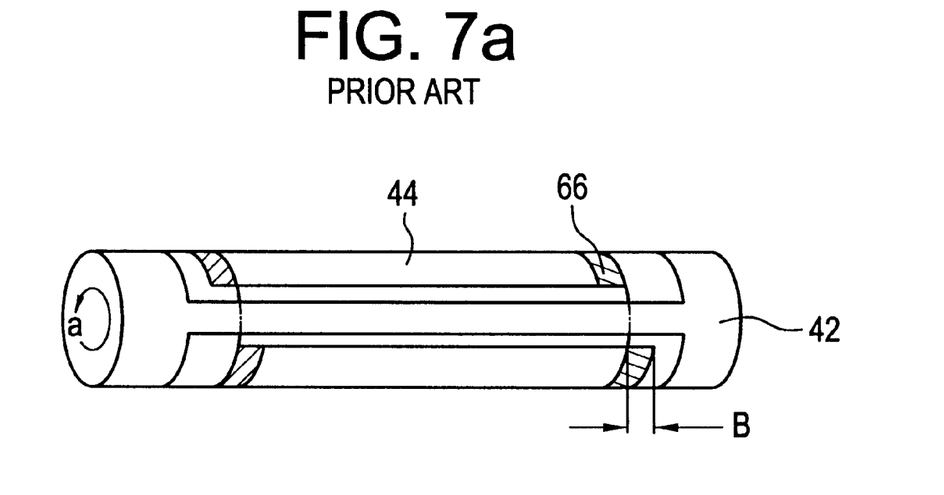
FIG. 7a is a simplified, segmented, isometric, explanatory view showing a recorded image being formed on plate material by one prior-art laser exposure device of a type of FIG. 6.

However, in the drum-type laser exposure device of FIG. 6, the drum 42, as shown in FIG. 7a, rotates at a constant speed, and the optical base 54 moves a distance of the band width B per revolution, so that the image band 66 is shifted by a distance of the band width B per revolution with recordings being made spirally on the plate material 44. When the plate material 44 is spread out, or flattened, it is seen that a recorded image 68 (FIG. 7b) consisting of many image bands 66 is formed. The recorded image 68 however, is a parallelogram shifted by a distance of the band width B due to spiral recording. Such deformation of the recorded image 68 with respect to the plate material 44 is unacceptable for printing plates for printing.

Figure 7B:
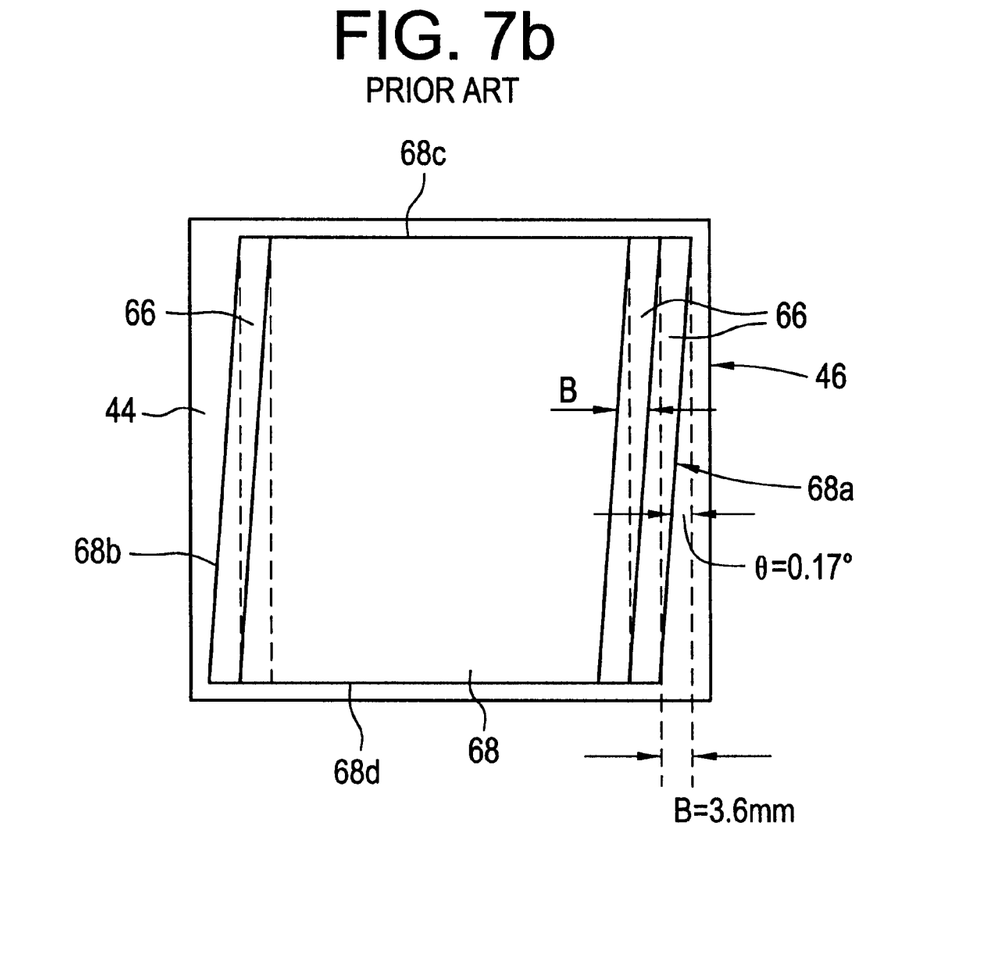
FIG. 7b is a schematic plan view of the plate materia of FIG. 7a, with a recorded image thereon, when flattened.

In this regard, for a printing plate for newspapers, assuming that an outer circumference of the drum is 46 inches, an image element density is 909 dots per inch, and a light-source array 22 with 128 beams is employed, the band width B is equivalent to 128 image elements, that is, 128/909=0.14 inch, or 3.6 mm. In other words, as a result of spiral recording, a distortion of 3.6 mm occurs between a top edge line 68c and bottom edge line 68d of the recorded image 68, which distortion is not visually negligible. The inclination angle θ is 0.17 degree, as calculated from tan θ=0.14/46, whereby a starting side edge line 68a and an ending side edge line 68b, though parallel to each other, have an inclined angle of 0.17 degree.

Figure 8A:
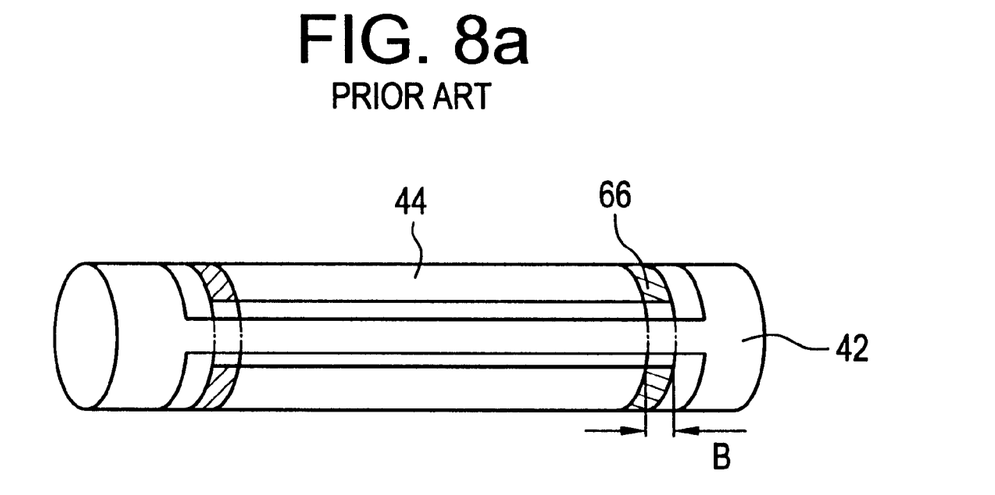
FIG. 8a is a simplified, segmented, isometric, explanatory view showing a recorded image being formed on a plate material by another prior-art drum-type laser exposure device (of an intermittent stop type).

To eliminate the inclination of the starting side edge line 68a of this image with respect to a starting side edge line 46 of the plate material 44, an intermittent moving system illustrated in FIG. 8 has been invented. That is, while one revolution of the drum 42 to effect image recording takes place, the optical base 54 is allowed to remain stopped. Thereafter, the optical base 54 is moved by a distance of the band width B by the moving mechanism H. The moving time must be set at an integral multiple of the time required for one drum revolution.

Figure 8B:
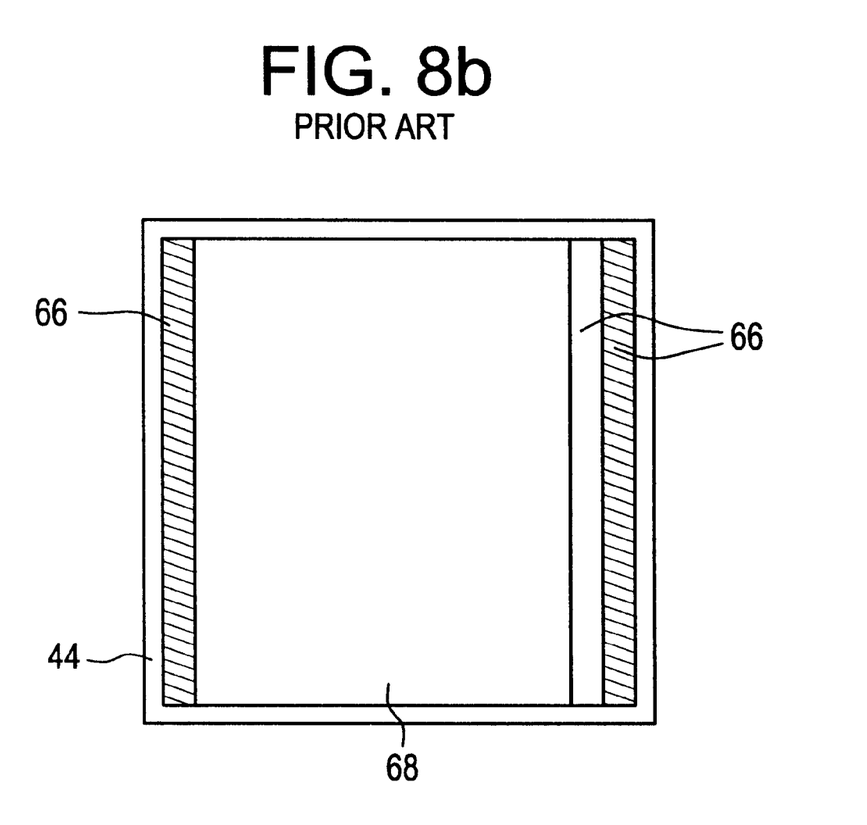
FIG. 8b is a schematic plan view of the plate material of FIG. 8a, with a recorded image thereon, when flattened.

Employing the intermittent moving system allows the image bands 66 to be formed not in the spiral shape but in a circular rectangular form, with a resulting image 68 (FIG. 8b) not being distorted but rather being recorded correctly in a regular quadrangle on the plate material 44.

However, the intermittent moving system has a disadvantage in that total exposure time is several times longer than the spiral system, thereby lowering efficiency of the printing-plate-producing operation. A necessity of repeated movement/stoppage of the heavy optical system makes the apparatus complicated and expensive. This also causes vibrations which are apt to cause a deteriorated image or a failure.

Figure 9A:
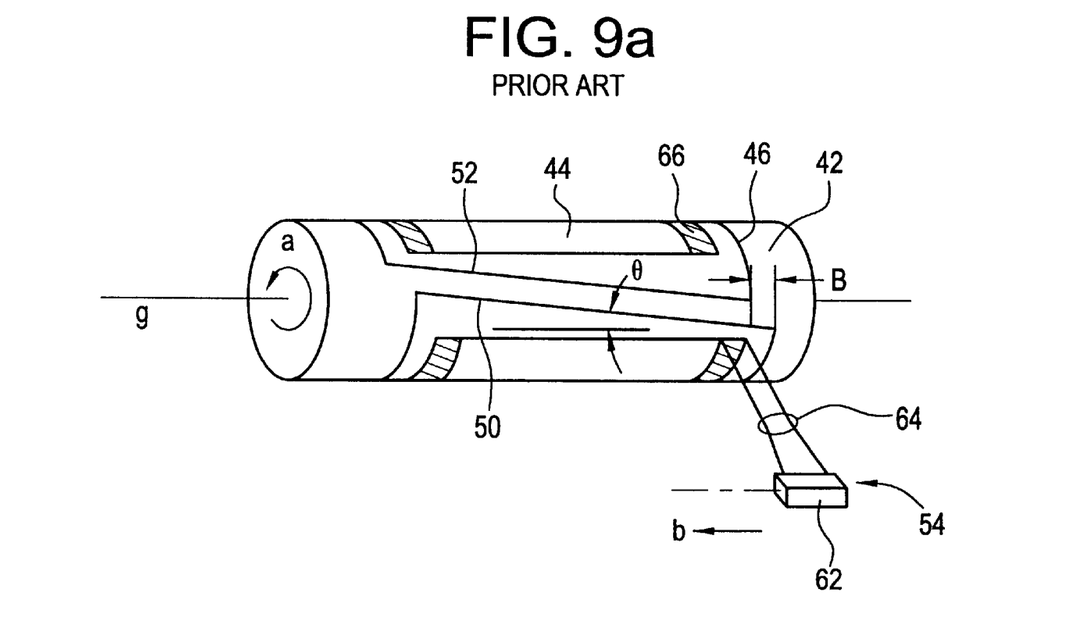
FIG. 9a is a simplified, segmented, isometric explanatory view of a recorded image being formed on a plate material by a drum-type laser exposure device described in Japanese Patent Application No. HEI-8-293494.
Figure 9B:
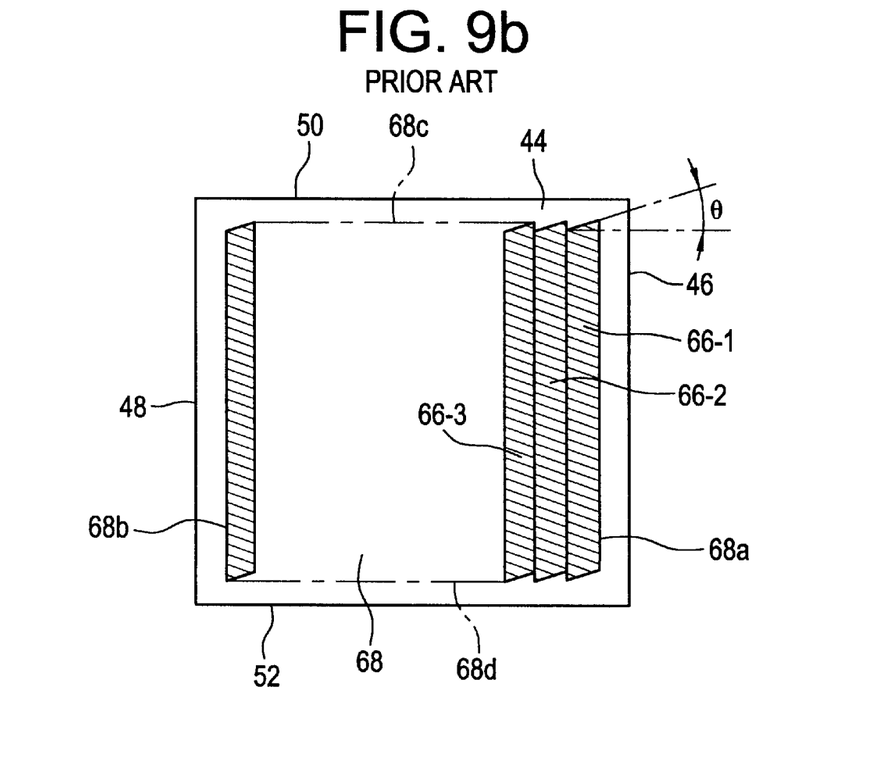
FIG. 9b is a schematic plan view of the plate material of FIG. 9a, with a recorded image thereon, when flattened.

Additionally, to solve problems of the above-mentioned drum-type exposure devices of FIGS. 7a and b and 8a and b, the inventor of this application has developed a novel exposure method as shown in FIG. 9a, toward which Japanese Patent Application No. HEI 8-293494 for a method was directed. That is, in the invention shown in FIG. 9a, the plate material 44 is wound in advance at an inclined angle θ spirally on the drum 42. Then, the optical base 54 is caused to move in the direction of the arrow b, parallel to an axial line g of the drum 42, and, further, the record starting position of each image band 66 is advanced by a certain amount by an electric timing signal, whereby a printing plate for printing is obtained as shown in FIG. 9b.

Figure 10A:
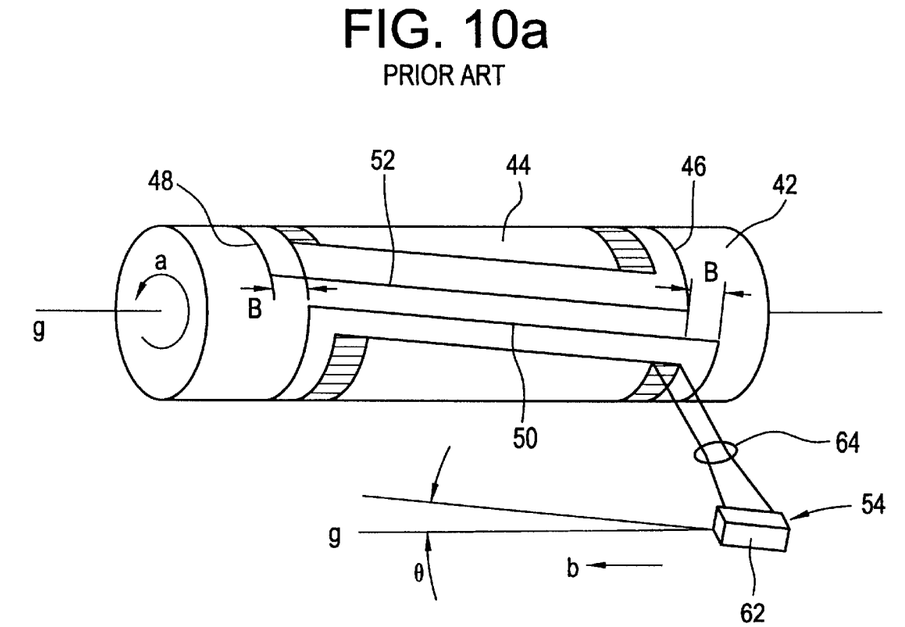
Figure 10B:
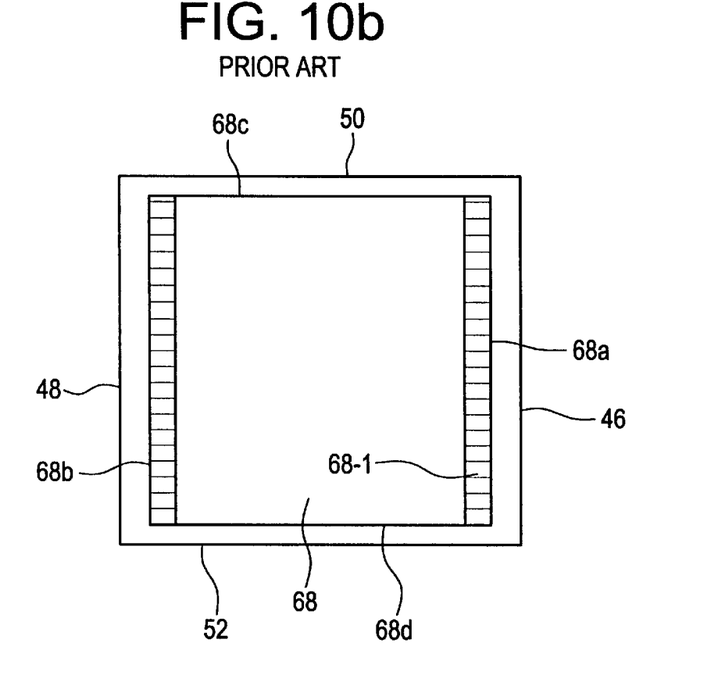
FIG. 10b is a schematic plan view of the plate materia of FIG. 10a, with a recorded image thereon, when flattened.

Also, in the invention of Japanese patent application No. HEI-8-293494, as shown in FIG. 10a, the optical base 54 is caused to move in a direction inclined by an angle θ with respect to the drum axis g, whereby a printing plate with no distortion of the recorded image with respect to the plate material 44, as shown in FIG. 10b, can be produced at a high speed, thereby exhibiting excellent practical usefulness.

However, in this invention of Japanese patent application No. HEI-8-293494, as shown in FIG. 10a, there is a problem in that the plate material 44 must be wound at an inclined angle θ spirally on the drum 42 rotatably supported in the horizontal direction, thereby making a mechanism for mounting the plate material 44 onto the drum 42 complicated.

Figure 11:
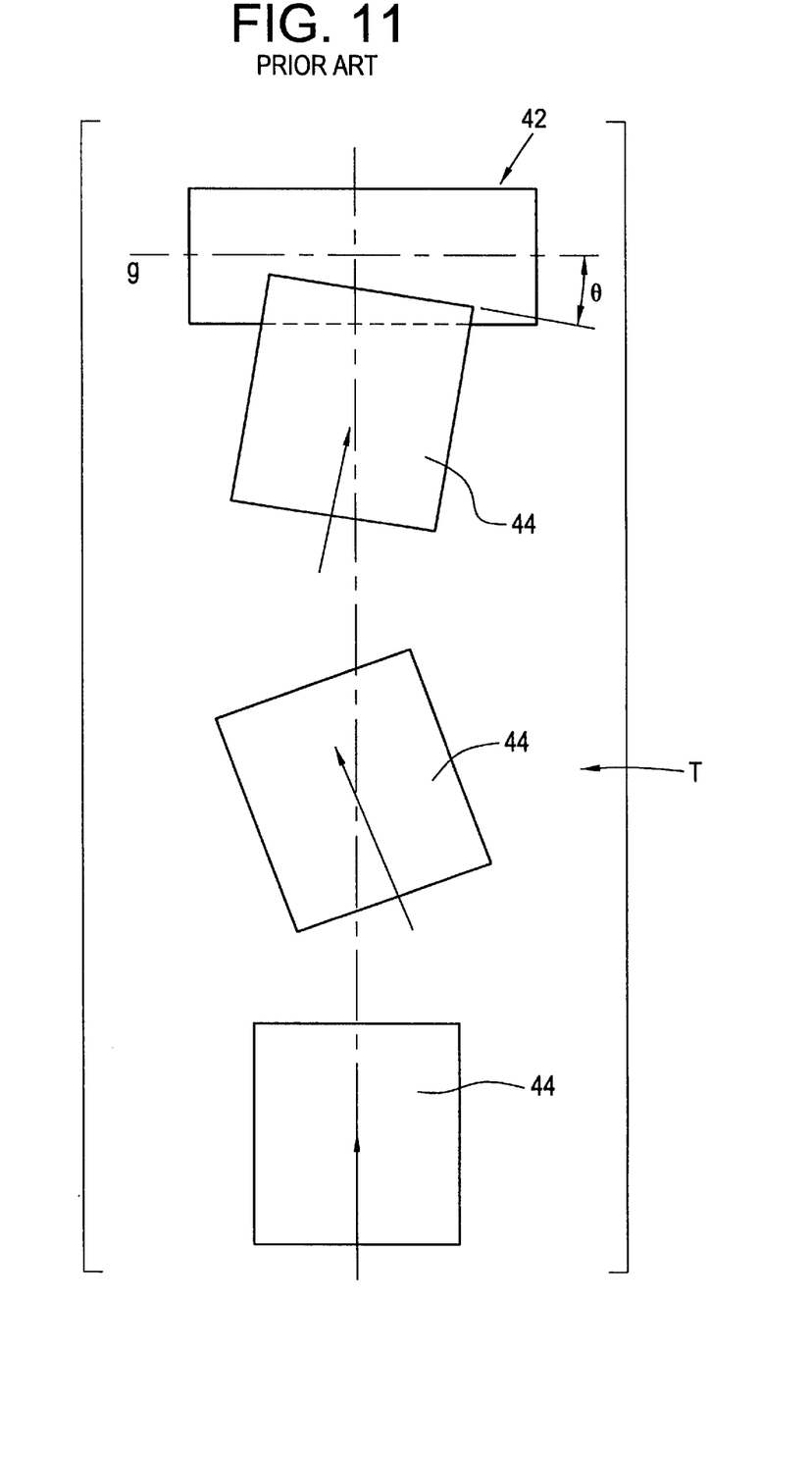

That is, when mounting the plate material 44, as shown FIG. 11, an orientation of the plate material 44 advancing toward the drum, or table, in a direction perpendicular to the axial line g of the drum 42, must be changed so that the plate material 44 must be mounted on the drum 42 and wound spirally, inclined by an angle θ. As a result, there is the disadvantage that a transfer mechanism T for transferring the plate material 44 is remarkably complicated.

It is an object of the present invention to solve the aforementioned problems of the apparatus of FIGS. 9a and 10a and the previous applications for producing printing plates with drum-type exposure devices. It is also an object of this invention to provide an apparatus for producing printing plates for printing newspapers with a drum-type exposure device in which a plate material is wound spirally on and fixed to the exposure drum without using a complicated plate material transfer mechanism T. In addition, it is an object of this invention to provide such an apparatus that can properly and efficiently handle plate material having a standard width and a plate material having double width.

SUMMARY OF THE INVENTION

According to principles of this invention, an apparatus for producing printing plates for printing newspapers includes: a plate feeder for feeding plate materials; an exposure device for exposing the plate materials conveyed from the plate feeder, the exposure device having an exposure drum which is inclined by a specified angle θ with respect to a direction perpendicular to a direction of advancement of the plate materials and on which the plate materials are wound spirally, and an exposing element for exposing the plate materials wound on the exposure drum; a development device for developing the plate materials conveyed from the exposure device; and a guide device capable of guiding two plate materials having standard width or one plate material having double width when they are conveyed from the plate feeder via the exposure device to the development device.

In one embodiment of the invention the plate feeder is equipped with a protection paper discharge device for discharging protection papers sideward.

In one embodiment of the invention the exposure device is structured with a plurality of pins on the exposure drum along a line inclined at an angle θ with respect to the axial center line of the exposure drum such that the plate materials are wound spirally on the exposure drum by engaging the pins with holes formed at a forward end of each plate material.

In one embodiment of the invention a boring device for forming holes at the forward end of each plate material is provided upstream of the exposure device.

In one embodiment of the invention the guide device comprises: a vertically movable separating plate capable of assuming a separating position in which the separating plate is between two plate materials having a standard width and a retracted position in which the separating plate is retracted for avoiding interference with one plate material having double width, guide plates for guiding a side of one printing material having double width, and pressing members on the left and right sides which press two plate materials having standard width in a direction of the separating plate with the pressing members on one side pressing one plate material having double width in the direction of the guide plates.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 10a is a simplified, segmented, isometric explanatory view showing a recorded image being formed on a plate material in a case where a direction of movement of an optical base is inclined by an angle θ with respect to an axial line g of a drum in an exposure device of FIG. 9a.

FIG. 11 is an explanatory, schematic, diagram showing a direction of conveyed plate material being changed so that the plate material is spirally wound on the exposure drum in the exposure device of FIG. 10a.

DETAILED DESCRIPTION OF THE INVENTION

Embodiments of the present invention will be explained hereinafter with reference to the drawings.

Figure 1:
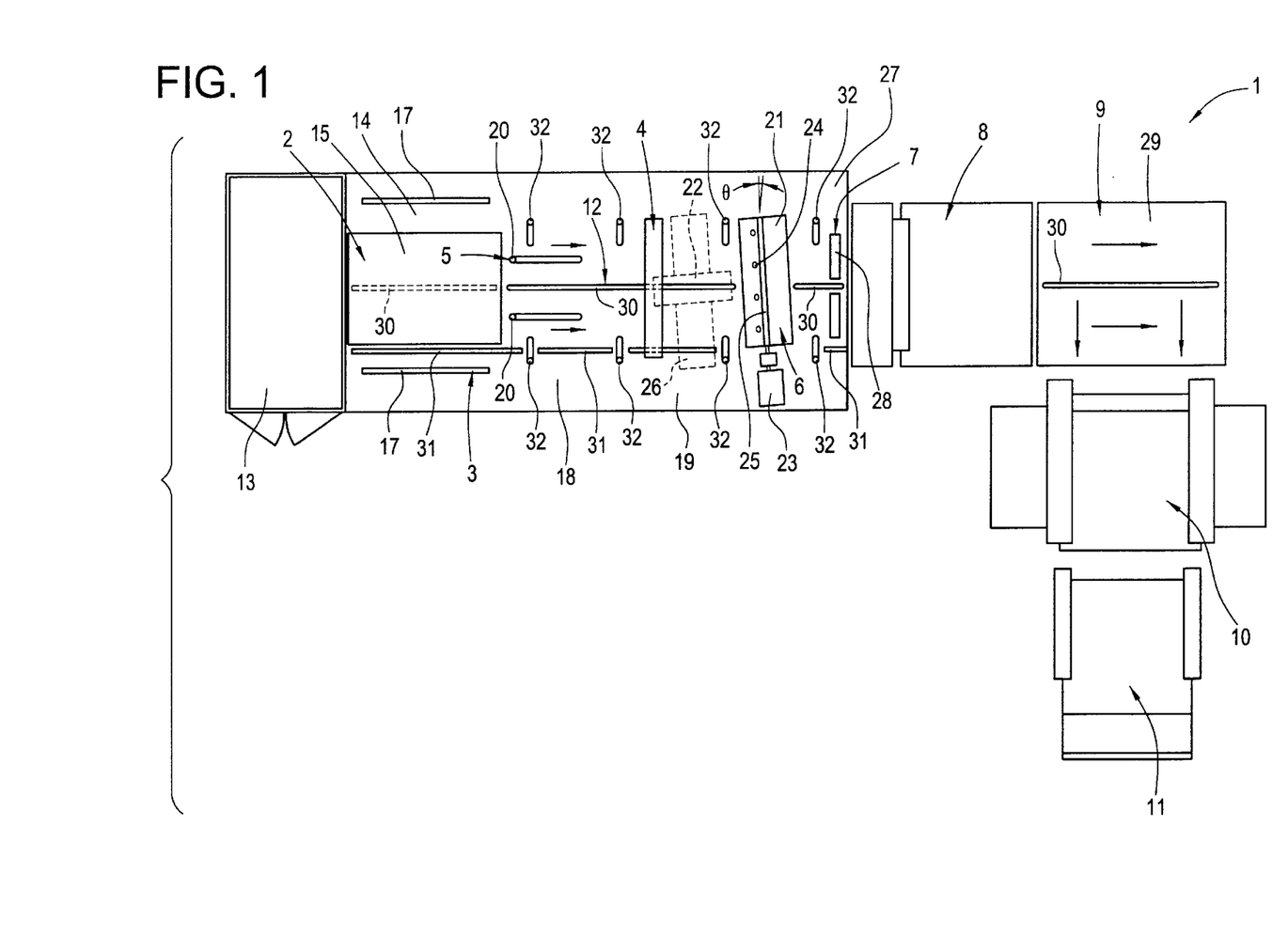
FIG. 1 is a plan view of a rough structure of an apparatus for producing printing plates for printing newspapers of the present invention.
Figure 2:
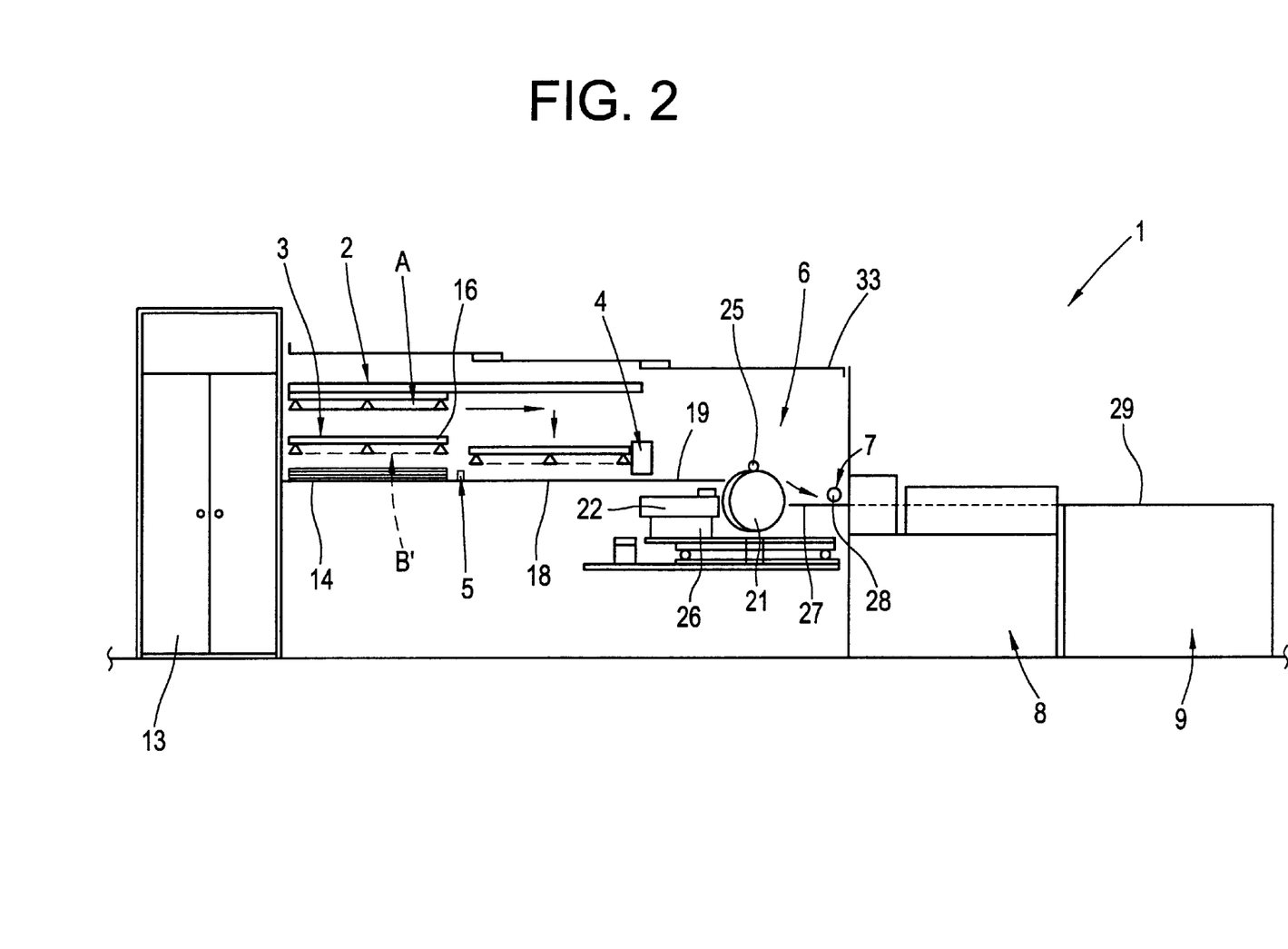
FIG. 2 is a side elevational view of the structure shown in FIG. 1.
Figure 3:
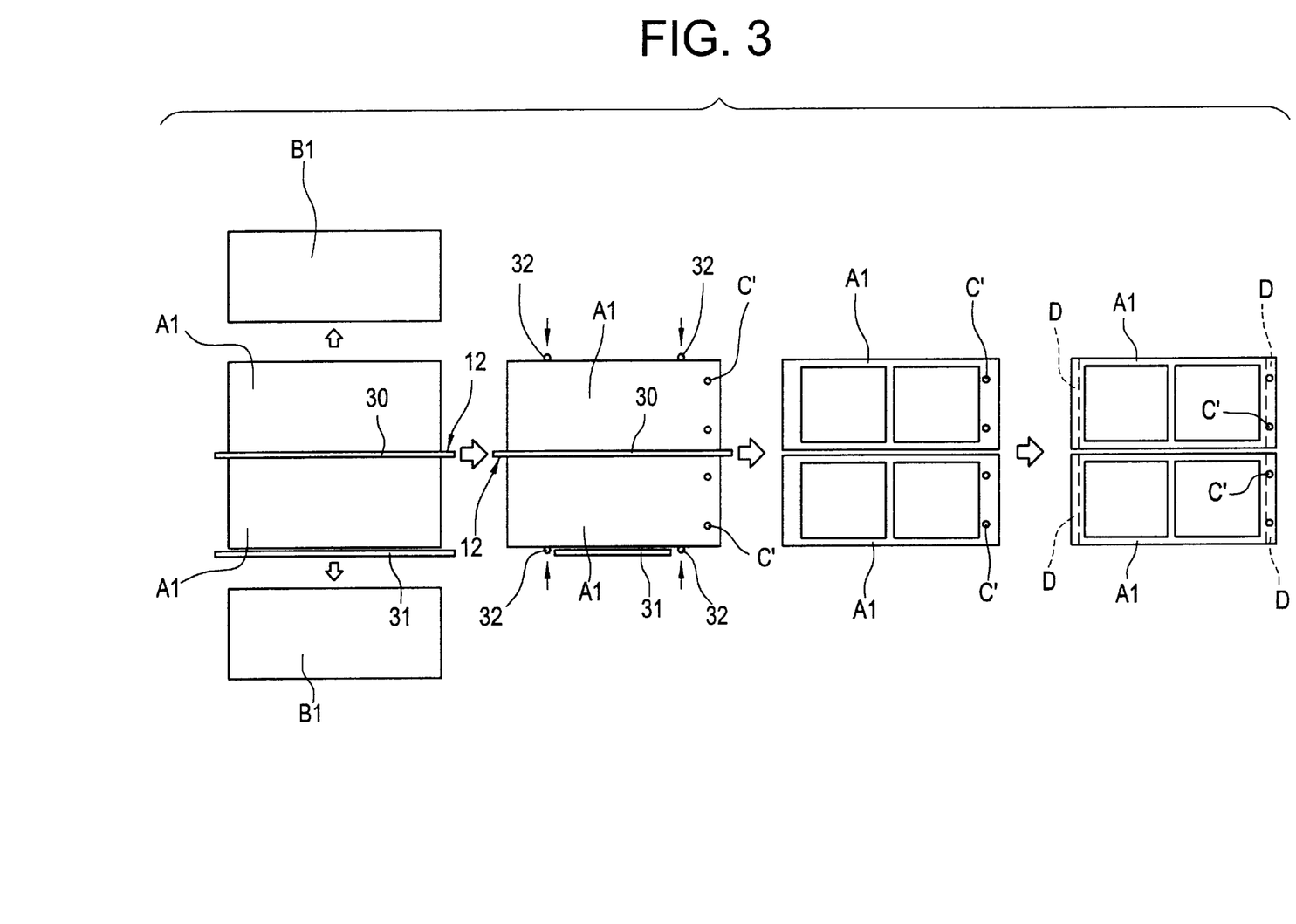
FIG. 3 is an explanatory diagram illustrating a process of producing two plate materials having standard width in another aspect of the present invention.
Figure 4:
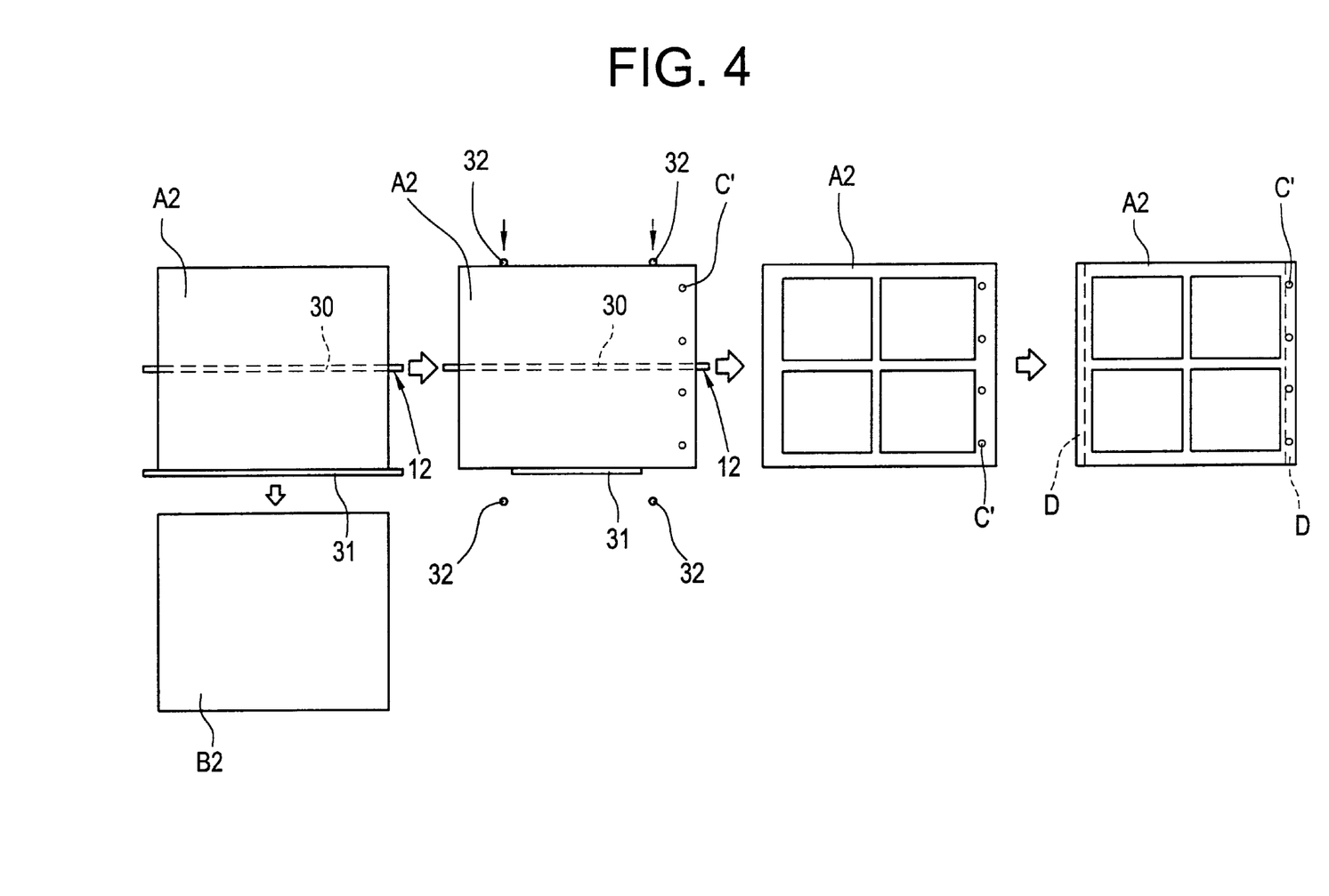
FIG. 4 is an explanatory diagram illustrating a process of producing one plate material having double width in another aspect of the present invention.

In the plan view of FIG. 1 an outline of an apparatus of the present invention for producing printing plates for printing newspapers can be seen. FIG. 2 is a side view of the apparatus of FIG. 1. FIG. 3 is an explanatory view showing a process of producing the printing plates from two plate materials having a standard width. FIG. 4 is an explanatory view showing a process of producing the printing plates from one plate material having double width.

The apparatus for producing the printing plates 1 for printing newspapers 1 comprises a plate feeder 2, a protection paper discharge device 3, a boring device 4, a conveying device 5, an exposure device 6, a plate delivery device 7, a development device 8, a direction changing device 9, a folding device 10, a printing plate storage device 11, and a guide device 12.

The plate feeder 2 feeds plate materials A, which plate feeder, in this example, includes: of a dark chamber 13 in which packed plate materials A are unpacked; a table 14 on which unpacked plate materials A are placed on one another with a protection paper B' interposed between the plate materials A; and a sucking and transferring device 15 for sucking top-most plate materials A one by one and sequentially transferring them forwardly (rightward in FIG. 1).

The plate material A, in this example, is made of a photosensitive printing plate (a so-called PS plate) obtained by applying photosensitive material such as a photo-hardened resin to an aluminum substrate, and is made up of two plate materials A1 each having standard width (plate materials each for two newspaper pages arranged longitudinally), or one plate material A2 having double width (plate material for four newspaper pages arranged longitudinally and laterally).

The protection paper discharge device 3 is provided at the plate feeder 2 to discharge the protection paper B' sideward. In this example, the protection paper discharge device 3 comprises right/left sucking and transferring devices 16 for sucking the protection paper B' interposed between plate materials A on the table 14 of the plate feeder 2 and transferring it into the right/left discharge rollers 17 for discharging the protection paper B'. The sucking and transferring device 16 is operated in a manner not to interfere with the sucking and transferring device 15 of the plate feeder 2.

The boring device 4 is provided at an upstream side of the exposure device 6 to form holes C' in the plate material A transferred from the plate feeder 2. In this example, the boring device 4 is positioned between the plate feeder 2 and the exposer device 6, and includes a table 18 which is intimately formed with the table 14 of the plate feeder 2 and on which plate materials A are placed. The boring device 4 comprises a press machine for forming a plurality of the holes C' aligned in a direction perpendicular to an axial line, in a longitudinal direction, of the plate material A and provided at a forward end of the plate material A.

The position of the above-mentioned plurality of holes C' is selected such that engaging pins on a printing drum of a rotary printing machine are suitably inserted into the holes C' when the printing plate, as produced, is mounted on the printing drum. The printing plate is mounted on the printing drum of the rotary printing machine by use on the holes C'.

The conveying device 5 conveys each plate material A from the boring device 4 to the exposure device 6. In this example, the conveying device 5 includes a table 19 continuously formed with the table 18 of the boring device 4, and conveying members 20 which pass through the table 18 of the boring device 4 and can be moved in forwardly/backwardly directions for pushing, and thereby conveying, in the forward direction a plate material A placed thereat. The conveying members 20 are operated by an actuator (not shown) such as an air cylinder.

The exposure device 6 exposes the plate material A conveyed from the plate feeder 2. In this example, the exposure device 6 includes an exposure drum 21 onto which the plate material A, fed from the boring device 4, is spirally wound, and an exposing element (a laser beam scanning head) 22 for exposing the wound plate material A.

The exposure drum 21 is supported to be inclined by a specified angle θ (0.17°) relative to the plate material A conveyed in a specified direction so that the plate material A is wound spirally thereon (the inclination is exaggerated in FIG. 1). The exposure drum 21 is supported to be rotated by a rotation mechanism (a servomotor) 23, and includes: pins 24 for accurately positioning the plate material A by engaging the holes C' of the plate material A, a vacuum sucker (not shown) for holding a rear edge of the plate material A, and a winding roller 25 parts of which have reduced diameters so as not to interfere with the pins 24 and which is used for winding and unwinding the above-mentioned plate material A.

The exposing element 22 is adapted to expose an image drawing corresponding to an image drawing transmitted from a computer directly onto the plate material A, and can be moved in a direction parallel to an axial line of the exposure drum 21 by a moving mechanism 26, or, as shown in FIG. 10a, parallel to a starting end edge 50 of the plate material wound spirally on the exposure drum, viewed from the front.

The plate delivery device 7 delivers the plate material A conveyed from the exposure device 6 to the development device 8. In this example, the plate delivery device 7 includes a table 27 for supporting thereon the plate material A conveyed from the exposure device 6, and a plate delivery roller 28 for forwardly conveying the plate material A supported on the table 27. The table 27 is positioned lower than the table 19 of the conveying device 4 so that the plate material A conveyed from the exposure device 6 is fed to the development device 8 with certainty.

Figure 5:
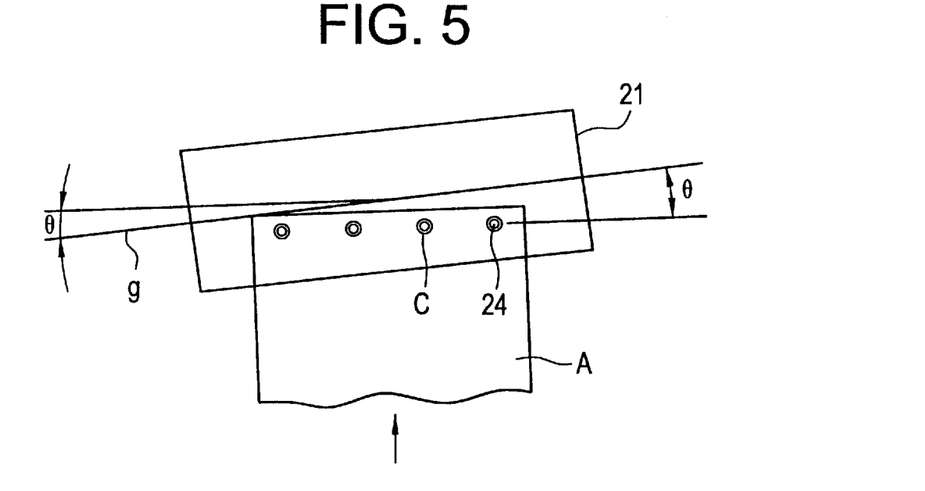
FIG. 5 is a simplified segmented enlarged view showing pins on an exposure drum engaging in holes formed in a plate material in another aspect of the present invention.

It will be appreciated that when the holes C' of the plate material A are aligned in a direction perpendicular to the direction of advancement of the plate material A as shown in FIG. 3, in order to wind the plate material A spirally on the exposure drum 21 inclined by the angle θ, the pins 24 of the exposure drum 21 must be aligned along a straight line inclined by the angle θ relative to the axial line g of the exposure drum 21, as shown in FIG. 5.

On the contrary, where the pins 24 of the exposure drum 21 are arranged in the direction of the axial center line g of the exposure drum 21, the holes C' of the plate material A must be formed along a line inclined by an angle θ with respect to the direction of advancement of the plate material A.

The development device 8 develops the exposed plate materials A. In this example, the development device 8 includes a developing section for removing, with use of a developer, portions other than portions hardened by exposure and a gum section for applying a gum liquid to the portions where the photo sensitive material was removed and for drying the gum (though these sections are not shown).

The direction changing device 9 changes the direction of the plate material A conveyed from the development device 8 in a perpendicular direction. In this example, the direction changing device 9 includes a table 29 for supporting thereon the plate material A conveyed from the development device 8 as its conveyed direction is changed rightwardly (downwardly in FIG. 1).

The folding device 10 forms folded portions D on the plate material A conveyed from the direction changing device 9 so as to allow the plate material A to be used as a printing plate. In this example, the folding device 10 comprises a press machine for forming roughly V-shaped folded portions D at the forward/rear edge portions of the plate material A so that the printing plate can be mounted on a rotary printing machine (not shown).

The printing plate storage device 11 stores sequentially in a specified state the printing plates conveyed from the folding device 10.

The guide device 12 guides two plate materials A1 each having standard width or one plate material A2 having double width as they are conveyed from the plate feeder 2 via the exposure device 6 to the development device 8. In this example, the guide device 12 comprises: a vertically movable separating plate 30 which can take a separating position in which the separating plate 30 is positioned between, and separates, the two plate materials A1 having standard width and which can also take a retracted position in which it avoids interference with one plate material A2 having a double width; guide plates 31 for guiding a side of one printing material A2 having double width; and pressing members 32 on left and right sides which, in one mode, press two plate materials A1 having standard width toward the separating plate 30 and which, in another mode, at least on one side, press one plate material A2 having double width toward the guide plates 31.

The separating plate 30 passes through respective centers of the table 14 of the plate feeder 2, the table 18 of the boring device 4, the table 19 of the conveying device 5, the table 27 of the delivery device 7, and the table 29 of the direction changing device 9 and is movable up and down so that the separating plate 30 is vertically movable from an upwardly projected, separating position to a downwardly buried, retracted position by an actuator (not shown), such as an air cylinder.

The guide plates 31 are fixed on respective right sides of the table 14 of the plate feeder 2, the table 18 of the boring device 4, the table 19 of the conveying device 5, and the table 27 of the plate delivery device 7.

The pressing members 32 are movable rightwardly/leftwardly and pass through respective right/left portions of the table 18 of the boring device 4, the table 19 of the conveying device 5, and the table 27 of the plate delivery device 7. The pressing members 32 are operated by an actuator (not shown) such as an air cylinder. The pressing members 32 are provided in a manner so as not to interfere with the guide plate 31.

The plate feeder 2, the protection paper delivery device 3, the boring device 4, the conveying device 5, the exposure device 6, and the plate delivery device 7, except for the dark chamber 13 of the plate feeder 2, are covered with a light resistant cover 33 which is opened and closed.

Operation of the apparatus will be explained hereinafter.

The packed plate materials A are transferred to the dark chamber 13 of the plate feeder 2 where the packed plate materials A are unpacked. A plurality of the unpacked plate materials A, between which the protection paper B' is interposed, are taken from the dark chamber 13, and are piled on the table 14 of the plate feeder 2 on top of one another.

The uppermost one of the plate materials A on the table 14 of the plate feeder 2 is held, one after the other, by the sucking and transferring device 15, and fed thereby to the boring device 4. As this is done, the protection paper B' interposed between the plate materials A is sucked by the sucking and transferring device 16 of the protection paper discharged device 3 and thereby transferred to the right/left sides to be discharged by the discharge rollers 17.

The plate materials A fed to the boring device 4 are sequentially placed on the table 18 where a plurality of holes C' are formed near, and in parallel to, the forward edge of the plate material A.

The plate material A, having the holes C' formed therein, is then pushed at its rear edge by the conveying members 20 of the conveying device 5, so as to be moved along the tables 18, 19, and conveyed to the exposure device 6.

Each plate material A transferred to the exposure device 6 is accurately positioned by engaging the pins 24 of the exposure drum 21 into the holes C' and, at the same time, vacuum sucking the forward edge portion so that the plate material A adheres closely to an outer surface of the exposure drum 21. Thereafter, by rotating the exposure drum 21 and the winding roller 25 in a winding direction, the plate material A is wound spirally at a specified inclined θ on the exposure drum 21, and finally held at the rear edge portion thereof by the vacuum sucker.

That is, the exposure drum 21 is inclined by a specified angle θ with respect to the plate material A conveyed in a specified direction, so that the plate material A is wound spirally on the exposure drum 21.

Thereafter, the exposure drum 21 is rotated in a specified direction by the rotation mechanism 23, and at the same time, the exposing element 22 is moved in a specified direction by the moving mechanism 26.

An image drawing signal (a digital signal) is sent from a computer for forming a printing plate through an image drawing controller (whose illustration is omitted) to the exposing element 22, so that a laser beam scan corresponding to the image drawings signal is performed on a plate face of the plate material A. This causes the so-called exposure of the plate material A.

The exposed plate material A is then released from being held at its rear edge by the vacuum sucker, and at the same time, the exposure drum 21 and the winding roller 25 are rotated in an opposite unwinding direction, whereby the plate material A is removed from the exposure drum 21 and delivered from the exposure device 6.

The plate material A delivered from the exposure device 6 is placed on the table 27 of the plate delivery device 7, and then fed to the development device 8 by the plate delivery roller 28.

Portions of the plate material A fed to the development device 8, other than portions hardened by exposure by the exposure device 6, are removed by a developer to form a printing plate face for printing. Finally, a protective treatment of the plate face is performed by applying a gum liquid and the like.

The plate material A transferred from the development device 8 is fed onto the table 29 of the direction changing device 9, where the direction of the plate material A is changed 90°.

The plate material A conveyed from the direction changing device 9 is fed to the folding device 10, where both forward/rear end edge portions of the plate material A are folded downward roughly in V-shapes to form the folded portions D. This causes the so-called printing plate to be formed.

Further, the printing plate conveyed from the folding device 10 is fed to the printing plate storage device 11, where the printing plate is stored on a specified date.

Where two plate materials A1 having standard width are simultaneously produced, as shown in FIG. 3, the separating plate 30 of the guide device 12 is raised and held in the separating position. The same number of plate materials A1 having standard width are placed on the right/left sides of the separating plate 30 on the table 14 of the plate feeder 2. Then, right/left side plate materials A1 having standard width are simultaneously supplied, one by one with the sucking and transferring device 15 of the plate feeder 2, from the table 14 of the plate feeder 2 to the boring device 4. the right/left protection papers B1 interposed between the plate materials A1 having standard width are delivered rightwardly/leftwardly by the right/left sucking and transferring device 16 and discharge rollers 17 of the protection paper discharge device 3 and they are discharged.

As the right/left side plate materials A1 having standard width are being conveyed to the boring device 4, the exposure device 6 and the development device 8, the right/left pressing members 32 of the guide device 12 are operated inwardly whereby the right/left side plate materials A1 having standard width abut against, and are transferred along, the separating plate 30.

The separating plate 30 of the guide device 12 at the direction changing device 9 is held in the retracted position when the right/left side plate materials A1 having standard width are conveyed to the folding device 10 so that the separating plate 30 of the guide device 12 does not interfere with the left side plate material A1 having standard width.

Where one plate material A2 having double width is used, as shown in FIG. 4, the separating plate 30 of the guide device 12 is lowered and held in the retracted position. Then, the plate materials A2 having double width are piled on one another at the left side of the guide plate 31 on the table 14 of the plate feeder 2.

Then, the plate materials A2 having double width on the table 14 of the plate feeder 2 are supplied by the sucking, transferring device 15 of the plate feeder 2 to the boring device 4. By operating only one of the sucking and transferring device 16 and one of the discharge rollers 17 of the protection paper discharge device 3, protection papers B2 having double width interposed between the plate materials A2 having double width are discharged in one direction.

When one plate material A2 having double width is fed to the boring device 4, the exposure device 6 and the development device 8, the pressing members 32 on the left side of the guide device 12 are operated for pressing the plate material A2 rightwardly, whereby one plate material A2 having double width is pressed against, and conveyed along, the guide plate 31. The separating plate 30 of the guide device 12 is held in the retracted position, so that the separating plate 30 provides no interference.

The exposure device 6 has one exposing element 22 in the above example, but is not limited to such construction, and, for example, may have two or more exposing elements 22. A plurality of exposing elements 22 allows exposure time to be shortened.

The separating plate 30 of the guide device 12, in the foregoing example, takes a separating position when raised, and takes a retracted position when lowered, but is not limited to this construction, and, for example, may be in a retracted position when raised to move away from the table, and in a separating position when lowered to be in contact with the table.

The guide plates 31 of the guide device 12, in the foregoing example, are fixed to the table, but are not limited to such arrangement, and, for example, in one embodiment, guide plates 31 are provided on pressing members 32 on one side to be in a stationary state when the plate materials A2 having double width are handled, thereby guiding the plate material A2 having double width.

The plate material A1 having standard width, in the foregoing example, has a size of two pages of newspapers connected longitudinally, but is not limited to such size, and for example, may be half that size, that is, one page of newspaper.

Further, the plate material A2 having double width, in the foregoing example, has a size of four pages of newspapers, but is not limited to such size, and, for example, may be half of that size, that is, a size of two pages of newspapers connected laterally.

Effect of the Invention

As described above, according to the present invention, excellent effects result as follows:

(1) An apparatus for producing printing plates includes a plate feeder, an exposure device, a development device and a guide device wherein an exposure drum of the exposure device is inclined by a specified angle θ with respect to a direction perpendicular to a direction of advancement of a plate material, and the advancing plate material is wound naturally in a spiral manner on the exposure drum.

As a result, the plate material is wound automatically in the spiral manner on the exposure drum even without changing the orientation or direction of advancement of the plate material at the upstream side of the exposure drum so that the conveying mechanism for the plate material can significantly simplified, and, at the same time, the printing plate can be produced at a high speed and with high efficiency.

(2) The apparatus has a construction in which a guide device is provided for guiding two plate materials having standard width or one plate material having double width conveyed from a plate feeder via an exposure device to a development device. As a result, the plate materials having standard width and the plate materials having double width can be produced with high precision, at a high speed and with high efficiency.

(3) Where a plate feeder is provided with a protection paper discharge device for delivering a protection paper sidewards, the protection paper can be mechanically and automatically discharged without help from workers, thereby allowing working efficiency to be improved.

(4) Where an exposure drum is constructed such that a plurality of pins are provided on and protrude therefrom, for engaging with holes C' formed at a forward edge portion of a plate material, the plate material is automatically wound spirally, with certainty, on the exposure drum. As a result, an exposure operation can be performed at a high speed and with a high precision and it is possible to produce, with a high efficiency, printing plates permitting high quality printing.

(5) Where a boring device for forming holes is provided at an upstream side of an exposure device, holes are formed in the plate material prior to exposure, whereby a winding of the plate materials on the exposure drum can be performed with certainty; and, at the same time, by utilizing the holes, the printing plates can be mounted accurately onto the printing drum of the rotary printing machine. As a result, in color printing and the like, accurate positioning of a plurality of sheets (four sheets) of plate materials can be easily performed.

(6) Where a guide device includes: a vertically movable separating plate capable of taking a separating position in which the separating plate is positioned between two plate materials having standard width and a retracted position in which the separating plate is retracted for avoiding interference with one plate material having double width, guide plates for guiding a side of one printing material having double width, and pressing members which press two plate material having standard width toward the separating plate and one plate material having double width toward the guide plates; the guide device can correctly guide both two plate materials having standard width and one plate material having double width and the pressing members on one side work to press the two plate materials having standard width and also the plate material having double width, thereby allowing construction to be simplified and production costs to be lowered.

What is claimed is:

1. An apparatus for producing printing plates for printing newspapers, said apparatus comprising:

a plate feeder for feeding plate material;

an exposure device for exposing the plate material conveyed from said plate feeder, said exposure device comprising an exposure drum which is inclined by a specified angle θ relative to a direction perpendicular to a direction in which the plate material is advanced toward the exposure drum and on which the plate material is spirally wound and an exposing element for exposing the plate material wound on the exposure drum;

a development device for developing the plate material conveyed from the exposure device; and a guide device structured for guiding two plate materials having standard width or one plate material having double width conveyed from the plate feeder via the exposure device to the development device;

wherein a plurality of pins are on the exposure drum along a line inclined by an angle θ with respect to an axial center line of the exposure drum such that the plate material is wound spirally on the exposure drum by engaging the pins with holes formed at a forward edge portion of the plate material.

2. An apparatus for producing printing plates for printing newspapers as set forth in claim 1, wherein the plate feeder is equipped with a protection paper discharge device for discharging the protection paper sidewardly to a direction in which the plate material is advanced from the plate feeder toward the exposure device.

3. An apparatus for producing printing plates for printing newspapers, said apparatus comprising:

a plate feeder for feeding plate material;

an exposure device for exposing the plate material conveyed from said plate feeder, said exposure device comprising an exposure drum which is inclined by a specified angle θ relative to a direction perpendicular to a direction in which the plate material is advanced toward the exposure drum and on which the plate material is spirally wound and an exposing element for exposing the plate material wound on the exposure drum;

a development device for developing the plate material conveyed from the exposure device; and a guide device structured for guiding two plate materials having standard width or one plate material having double width conveyed from the plate feeder via the exposure device to the development device;

wherein the guide device comprises: a vertically movable separating table for being at a separating position between two plate materials having standard width and a retracted position in which the separating plate is retracted for avoiding interference with one plate material having double width; guide plates for guiding a side of one printing material having double width; and pressing members on the left and right sides which press two plate materials having standard width toward the separating plate, with pressing members on one side pressing one plate material having double width toward the guide plates.

4. An apparatus for producing printing plates for printing newspapers as set forth in claim 3, wherein a boring device for forming holes at a forward end portion of the plate material is provided at an upstream side of the exposure device.

* * * * *